US006106915A

United States Patent [19]

Ruben

[11] Patent Number: 6,106,915

[45] Date of Patent: Aug. 22, 2000

[54] PAPER REINFORCING AND REPAIR RINGS

[76] Inventor: Philip H. Ruben, 505 N. Arden Dr., Beverly Hills, Calif. 90210

[21] Appl. No.: 09/141,548

[22] Filed: Aug. 28, 1998

[51] Int. Cl.[7] .......... B32B 3/10

[52] U.S. Cl. .......... 428/40.1; 428/43; 428/66.6; 402/79

[58] Field of Search .......... 428/43, 66.6, 40.1, 428/42.3; 402/79, 500

[56] References Cited

U.S. PATENT DOCUMENTS 1,869,385 8/1932 Maish .......... 428/66.6

3,315,683 4/1967 Rodriguez et al. .......... 402/79

*Primary Examiner*—Alexander Thomas

*Attorney, Agent, or Firm*—Fletcher, Yoder & Van Someren

[57] ABSTRACT

A reinforcement pad can be applied to sheets of paper, such as notebook paper. The reinforcement pad generally comprise a ring having a split region. The split region permits placement of the reinforcement ring around an object, such as the ring of a ring binder, without removing the sheet to be repaired or splitting the ring. Preferably, the ring includes an adhesive surface that permits easy mounting to the desired sheet at the damaged area.

3 Claims, 2 Drawing Sheets

PAPER REINFORCING AND REPAIR RINGS

FIELD OF THE INVENTION

The present invention relates generally to hole reinforcement and repair rings used in repairing, for instance, holes in three-ring binder paper that has torn. Particularly, the present invention relates to improved reinforcement and repair rings that may be used to repair notebook paper or other sheets without disengaging the notebook paper from the binder.

BACKGROUND OF THE INVENTION

Binders, such as three-ring binders, have long been used for holding loose-leaf notebook paper. Typically, the loose-leaf notebook paper has three or more holes punched therethrough along one of its edges. Those holes are aligned with the rings of the ring binder, such that individual sheets may be added or removed from the binder.

A common problem with loose-leaf binder sheets is that the sheet is easily torn between the binder ring mounting holes and the adjacent edge of the sheet. When one or more of the holes tear through, use of the binder becomes much more difficult. The sheets are harder to turn and tend to fall out of alignment with the other sheets in the binder.

Traditionally, premade rings or donut-shaped reinforcements were glued about the "torn-out" hole to reinforce the loose-leaf sheets. With the advent of self-adhesive labels, the reinforcement rings were peeled from a backing and placed over the torn hole in the paper. To make the repair, the binder was opened, and the torn sheet of paper removed so that the reinforcement could be glued or otherwise adhered to the sheet of notebook paper about the hole. This method of repair was and is inconvenient and time-consuming, because the ring binder must be opened and the sheet of torn paper removed. With large binders, it can be difficult to open and close the rings, particularly when the binder is substantially filled with loose-leaf sheets.

It would be advantageous to have a reinforcement pad that could be used to repair torn sheets of paper without opening the binder or removing the subject sheet of paper.

SUMMARY OF THE INVENTION

The present invention features a device for repairing loose-leaf notebook paper for use in a ring binder. The device comprises a reinforcement pad. The pad is configured to have a top surface, a bottom surface, an outer edge and an aperture therethrough. A slit extends from the aperture to the outer edge to permit easy application of the pad to a sheet of paper while positioned in a ring binder. Additionally, an adhesive is applied to the bottom surface of the reinforcement pad.

According to another aspect of the invention, a device for repairing loose-leaf notebook paper is provided with a substrate. Adhered to the substrate is a plurality of reinforcement pads. Each reinforcement pad includes an outer edge and an inner edge that defines an inner opening therethrough. The inner opening is of sufficient size to receive a ring from a typical ring binder. Additionally, each reinforcement pad include s a weakened area disposed between the outer edge and the inner edge to permit repair of torn edges of the notebook paper.

According to yet another aspect of the invention, a device is provided for strengthening a sheet of paper in a region surrounding a hole therethrough. The device includes a reinforcement pad having an incomplete ring of reinforcement material that terminates at a pair of ends. The ends are designed for easy separation to facilitate deployment of the reinforcement material around an object, such as the ring from a three ring binder, when repairing the loose-leaf sheets.

BRIEF DESCRIPTION OF THE DRAWINGS

The invention will hereafter be described with reference to the accompanying drawings, wherein like reference numerals denote like elements, and.

DETAILED DESCRIPTION OF THE PREFERRED EMBODIMENTS

Figure 1:
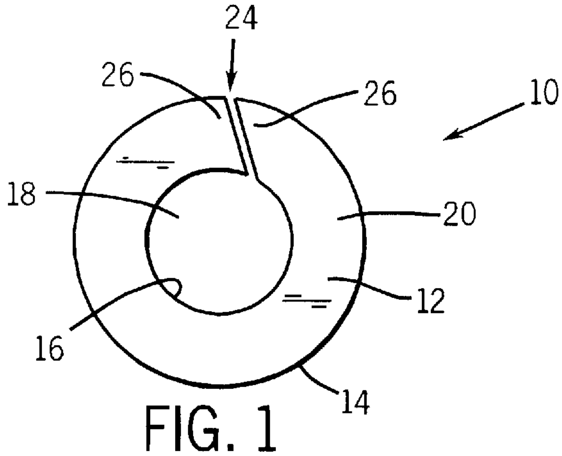
FIG. 1 is a front view of a device for repairing sheets of loose-leaf paper torn proximate a mounting hole, according to a preferred embodiment of the present invention.
Figure 2:
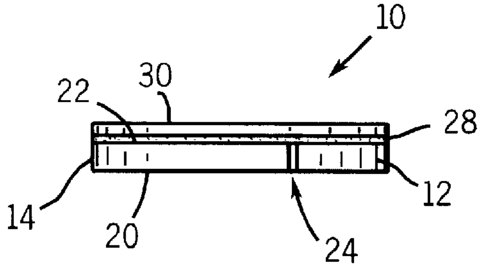
FIG. 2 is a top view of the device illustrated in FIG. 1.

Referring generally to FIGS. 1 and 2, a device 10 is illustrated according to a preferred embodiment of the present invention. Device 10 is used to repair tears in sheets, such as sheets of paper. Typically, device 10 is used to repair torn out areas adjacent the mounting holes of loose-leaf notebook paper of the type utilized in a ring binder.

Device 10 generally comprises a reinforcement pad 12 that preferably is made from a paper or plastic material. Reinforcement pad 12 may have variety of shapes and configurations, but it is generally flat and includes an outer edge 14 and an inner edge 16 that defines an aperture or opening 18 disposed through reinforcement pad 12.

Between outer edge 14 and inner edge 16, reinforcement pad 12 includes a top surface 20 and a bottom surface 22. Also extending between outer edge 14 and inner edge 16 is a split region 24. Split region 24 is defined by a pair of ends 26 of reinforcement pad 12. Preferably, ends 26 are proximate one another, but they can be separated by a space that extends, for instance, $1/16^{th}$ to $1/4^{th}$ of the perimeter of reinforcement pad 12.

Split region 24 is designed to permit selective separation of ends 26, thereby allowing reinforcement pad 12 to be positioned around objects (such as the ring of a ring binder) extending through opening 18. Without split region 24, a torn sheet could not be repaired without removing the paper from the ring binder or at least opening the ring binder to permit the reinforcement pad to be slid along the ring and into contact with the damaged sheet.

An adhesive 28 is applied to bottom surface 22 to permit the adherence of reinforcement pad 12 to the torn sheet. Adhesive 28 may be a wetable adhesive or a selfstick adhesive. In the latter case, a peelable backing layer 30 may be applied to adhesive 28. Prior to placement of reinforcement pad 12 against a desired sheet, peelable backing layer 30 is removed to expose adhesive 28.

In the embodiment illustrated, outer edge 14 and inner edge 16 are generally circular and concentric. However, reinforcement pad 12 potentially can have other shapes, such as ovals, squares or rectangles, and opening 18 may have a variety of shapes and locations within outer edge 14.

Split region 24 also may have a variety of configurations. For example, in the embodiment illustrated in FIGS. 1 and 2, split region 24 is a generally linear slit. However, reinforcement pad 12 may have a curvilinear split region 32, as illustrated in FIG. 3.

Figure 3:
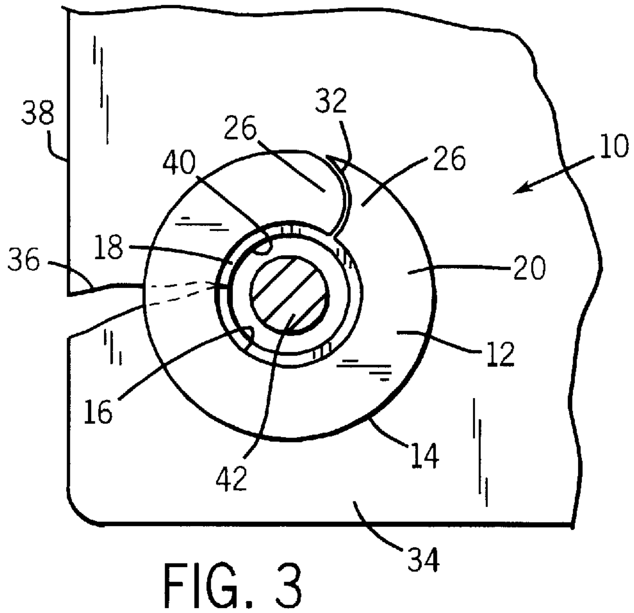
FIG. 3 is a front view of an alternate embodiment of the device illustrated in FIG. 1.

In the embodiment illustrated in FIG. 3, reinforcement pad 12 is shown applied to a sheet 34, such as a sheet of notebook paper. Sheet 34 has a damaged region 36 extending between a sheet side edge 38 and a sheet mounting hole 40. Mounting hole 40 is disposed through sheet 34 and is designed to receive an object, such as a ring 42 of a ring binder.

As illustrated, reinforcement pad 12 is adhered to sheet 34 about mounting hole 40 to repair damaged region 36. The placement of reinforcement pad 12 about sheet mounting hole 40 permits sheet 34 to be placed and used in a ring binder. The split region 32, as with split region 24, permits ends 26 of reinforcement pad 12 to be separated as reinforcement pad 12 is properly placed about ring 42. The split region allows the repair to be made while ring 42 remains closed and extended through mounting hole 40 of sheet 34.

Figure 4:
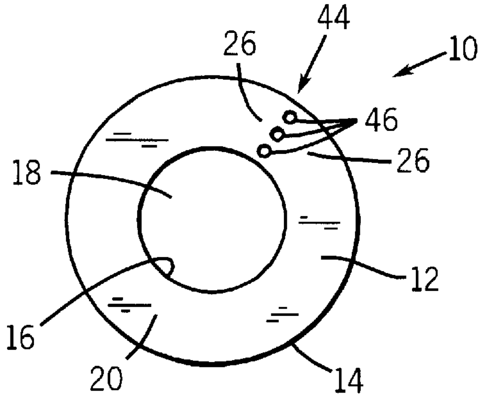
FIG. 4 is another alternate embodiment of the device illustrated in FIG. 1.

An alternate embodiment of reinforcement pad 12 is illustrated in FIG. 4. In this embodiment an alternate split region 44 includes at least one and preferably a plurality of perforations 46. Split region 44 may be separated at perforations 46 to permit placement of reinforcement pad 12 about a desired object.

Figure 5:
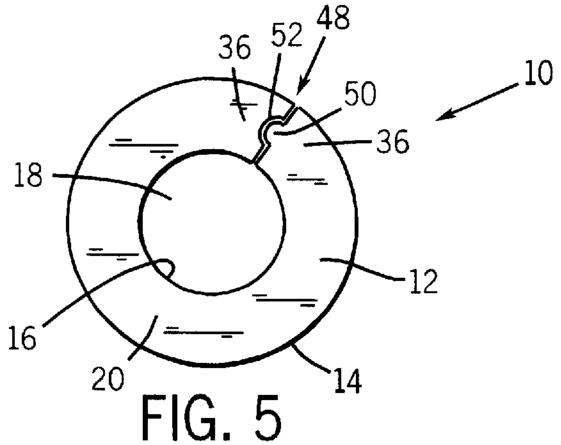
FIG. 5 is another alternate embodiment of the device illustrated in FIG. 1.

Another alternate embodiment of reinforcement pad 12 is illustrated in FIG. 5. In this embodiment, an interlocking split region 48 extends between outer edge 14 and inner edge 16. Interlocking split region 48 includes a tab 50 at one end 36 and a receptacle 52 at the adjacent end 36. Tab 50 is designed to engage receptacle 52.

Figure 6:
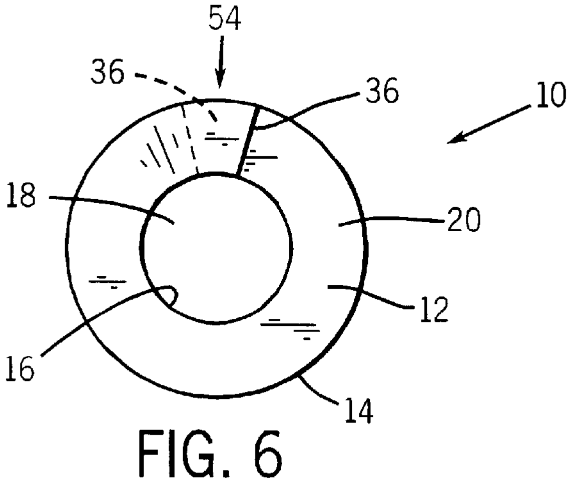
FIG. 6 is a front view of an alternate embodiment of the device illustrated in FIG. 1.
Figure 7:
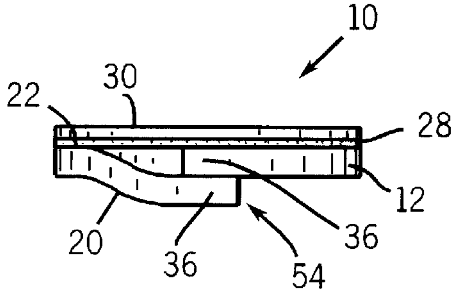
FIG. 7 is a top view of the device illustrated in FIG. 6.

Another alternate embodiment of reinforcement pad 12 is illustrated in FIGS. 6 and 7. In this embodiment, an overlapping split region 54 utilizes overlapped ends 36. This design is analogous to the design of a "lock-washer" but allows for the e as y separation of ends 36 during placement of reinforcement pad 12 about an object, such as ring 42.

Figure 8:
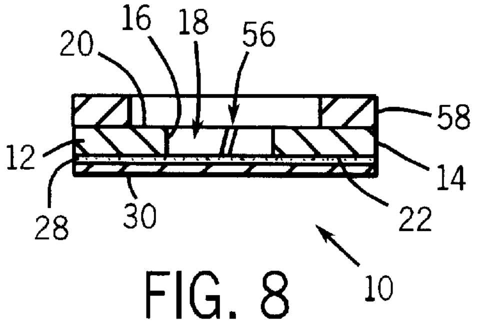
FIG. 8 is a cross-sectional view of an alternate embodiment of the device illustrated in FIG. 1.
Figure 9:
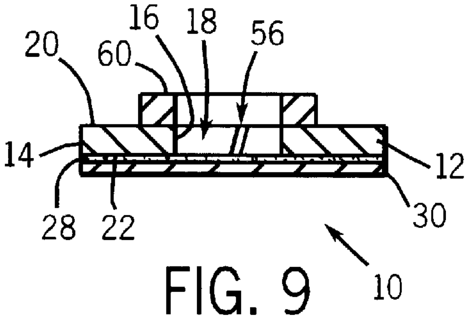
FIG. 9 is a cross-sectional view of another alternate embodiment of the device illustrated in FIG. 1.

Further alternate embodiments of the present invention are illustrated in FIGS. 8 and 9. In these embodiments, a variety of split regions 56 may be used, however, the thickness of reinforcement pad 12 is varied between outer edge 14 and inner edge 16. For example, an added layer 58 may be applied to top surface 20 to add greater strength. Similarly, a n added layer 60 may be applied along inner edge 16 to also provide added strength, particularly adjacent opening 18. There also are other configurations of reinforcement pad 12 in which its thickness is varied. For example, the thickness may taper towards the inner edge 16 or towards the outer edge 14 or both. Other ridges, grooves or designs may be used to alter the thickness of reinforcement pad 12 to achieve added strength and/or a desired aesthetic quality.

Figure 10:
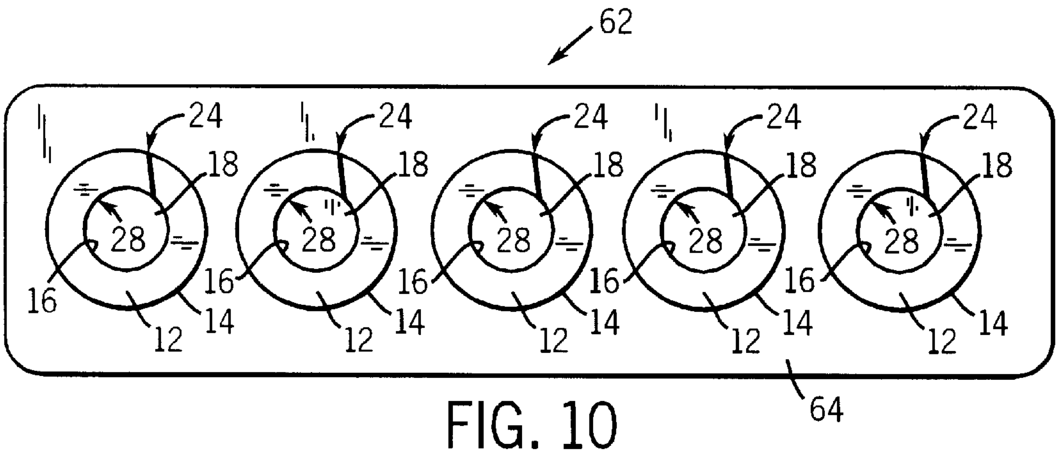
FIG. 10 is a front view of a substrate on which a plurality of reinforcement pads are mounted, according to a preferred embodiment of the present invention.

Referring generally to FIG. 10, a system 62 for carrying a plurality of reinforcement pads 12 is illustrated. System 62 includes a substrate 64, such as a paper or plastic sheet to which multiple reinforcement pads may be attached by an adhesive 28, such as a selfadhesive. Preferably, the reinforcement pads 12 are aligned in at least one row along substrate sheet 64. The reinforcement pads 12 may be any of the varieties described in FIGS. 1 through 9.

It will be understood that the foregoing description is of preferred exemplary embodiments of this invention, and that the invention is not limited to the specific forms shown. For example, a variety of reinforcement pad materials, reinforcement pad shapes and adhesives can be used in the present device. These and other modifications may be made in the design and arrangement of the elements without departing from the scope of the invention as expressed in the appended claims.

What is claimed is:

1. A device for repairing loose-leaf notebook paper for use in a ring binder, comprising:

a reinforcement pad having a top surface, a bottom surface, an outer edge and an aperture therethrough, wherein a split region extends from the aperture to the outer edge; and an adhesive applied to the bottom surface, wherein the split region defines an interlocking tab.

2. A device for repairing loose-leaf notebook paper for use in a ring binder, comprising:

a substrate;

a plurality of reinforcement pads, each reinforcement pad having an outer edge and an inner edge defining an inner opening therethrough, the inner opening being of sufficient size to receive a ring from a ring binder, wherein each reinforcement pad includes a weakened area disposed between the outer edge and the inner edge; and an adhesive disposed between each reinforcement pad and the substrate, wherein the weakened area comprises a slit extending from the inner edge to the outer edge, wherein the slit forms an interlocking tab.

3. A device for repairing loose-leaf notebook paper for use in a ring binder, comprising:

a substrate;

a plurality of reinforcement pads, each reinforcement pad having an outer edge and an inner edge defining an inner opening therethrough, the inner opening being of sufficient size to receive a ring from a ring binder, wherein each reinforcement pad includes a weakened area disposed between the outer edge and the inner edge; and an adhesive disposed between each reinforcement pad and the substrate, wherein the reinforcement pad is overlapped at the weakened area.

* * * * *